US012396073B2

(12) United States Patent
Huang

(10) Patent No.: US 12,396,073 B2
(45) **Date of Patent: *Aug. 19, 2025**

(54) INTELLIGENT-IDENTIFICATION QUICK-CHARGE HEATING CONTROL DEVICE FOR ELECTRIC HEATING PRODUCTS

(71) Applicant: Wanglai Huang, Beijing (CN)

(72) Inventor: Wanglai Huang, Dongguan (CN)

( * ) Notice: Subject to any disclaimer, the term of this patent is extended or adjusted under 35 U.S.C. 154(b) by 1217 days.

This patent is subject to a terminal disclaimer.

(21) Appl. No.: 17/160,404

(22) Filed: Jan. 28, 2021

(65) Prior Publication Data

US 2022/0240348 A1 Jul. 28, 2022

(51) Int. Cl.

*H05B 1/02* (2006.01)
*H05B 6/06* (2006.01)
*H05B 6/48* (2006.01)

(52) U.S. Cl.

CPC ................. *H05B 6/48* (2013.01); *H05B 6/06* (2013.01)

(58) Field of Classification Search

CPC .......... H05B 6/06; H05B 6/48; H05B 1/0236; A61F 2007/0077; A61F 2007/008; A61F 2007/0081

See application file for complete search history.

(56) References Cited

U.S. PATENT DOCUMENTS

| | | | | |
|---|---|---|---|---|
| 11,980,569 B2 * | 5/2024 | Huang | ...................... | A61F 7/02 |
| 2016/0091196 A1 * | 3/2016 | Chien | ................. | F21V 33/0048 362/253 |
| 2017/0139467 A1 * | 5/2017 | Waters | .................. | G06F 13/385 |
| 2017/0192923 A1 * | 7/2017 | Liu | ........................ | G06F 13/385 |
| 2023/0239969 A1 * | 7/2023 | Yang | .................... | H05B 1/0272 219/501 |

* cited by examiner

*Primary Examiner* — Hung D Nguyen
(74) *Attorney, Agent, or Firm* — Leong C. Lei

(57) ABSTRACT

An intelligent-identification quick-charge heating control device for electric heating products includes a button wake-up circuit, a power supply circuit, an output control circuit, a main control circuit that supports a quick charge (QC) protocol and a Type-C interface used for a paired connection with a quick charge source, so that the quick charge source can charge a heating load quickly after obtaining a successful handshake communication, so as to achieve the effects of reducing the heating time and improving the heating efficiency.

10 Claims, 2 Drawing Sheets

INTELLIGENT-IDENTIFICATION QUICK-CHARGE HEATING CONTROL DEVICE FOR ELECTRIC HEATING PRODUCTS

BACKGROUND OF THE INVENTION

1. Field of the Invention

The present invention relates to the field of heating control devices, and more particularly to an intelligent-identification quick-charge heating control device for electric heating products.

2. Description of the Prior Art

Electric heating products (such as electric heating quilts, electric blankets, hot compresses, etc.) are essential items for cold winters. At present, it is difficult for a controller of the electric heating products on the market to quickly identify a quick charge source in order to charge a heating load more quickly (with a higher DC voltage), and thus resulting in long heating time and low heating efficiency. In addition, the conventional quick charge source will enter into a sleep mode and result in no output current after having been working for a period of time.

In view of the aforementioned problems of the prior art, the inventor of the present invention based on years of experience in the related industry to conduct extensive research and experiment, and finally developed an intelligent-identification quick-charge heating control device for electric heating products in accordance with the present invention to overcome the problems of the prior art.

SUMMARY OF THE INVENTION

Therefore, it is a primary objective of the present invention to provide an intelligent-identification quick-charge heating control device for electric heating products, so that after a successful handshake, a quick charge source can charge a heating load quickly to reduce the heating time and improve the heating efficiency, and users may operate a button to wake up the quick charge source to continue working, so as to avoid the quick charge source from entering into the sleep mode and wake up the operation flexibly.

To achieve the aforementioned and other objectives, the present invention discloses an intelligent-identification quick-charge heating control device for electric heating products comprising a button wake-up circuit for waking up a quick charge source by a button, a main control circuit that supports a quick charge (QC) protocol, a power supply circuit for supplying power to the main control circuit, a Type-C interface for pairing and coupling the quick charge source, and an output control circuit coupled to a heating load, and the main control circuit being coupled to the output control circuit and the button wake-up circuit; wherein, the Type-C interface comprises a pin IN+, a pin IN−, a pin D+, a pin D− and a pin OUT1−, the pin IN+ is coupled to the power supply circuit through the button wake-up circuit, the pin IN− is grounded, the pin D+ and pin D− are coupled to the main control circuit and completes a handshake communication of a quick charge (QC) protocol with the quick charge source, the pin OUT1− is coupled to the output control circuit to quickly charge the heating load under the condition of the handshake communication.

Compared with the prior art, the present invention has the following advantages and effects: The invention mainly uses the main control circuit that supports the quick charge (QC) protocol and the quick charge source to complete a handshake communication of the quick charge (QC) protocol and achieve the effects of quickly charging the heating load by the quick charge source after obtaining a successful handshake communication with the quick charge source, so as to reduce the heating time and improve the heating efficiency. Primarily, the invention uses the button wake-up circuit to automatically operate the button to wake up the quick charge source to continue working, so as to avoid the quick charge source from entering into the sleep mode, and the wakeup process is automatic and flexible.

Secondly, the invention uses the overvoltage detection circuit and the anti-surge circuit to improve the safety and reliability of the product.

Thirdly, the invention uses the status indicating light circuit to timely show the operating status of the product and the overall circuit structure is designed skillfully and reasonably to ensure the stability and reliability of the product during use.

DETAILED DESCRIPTION OF THE PREFERRED EMBODIMENTS

Figure 1:
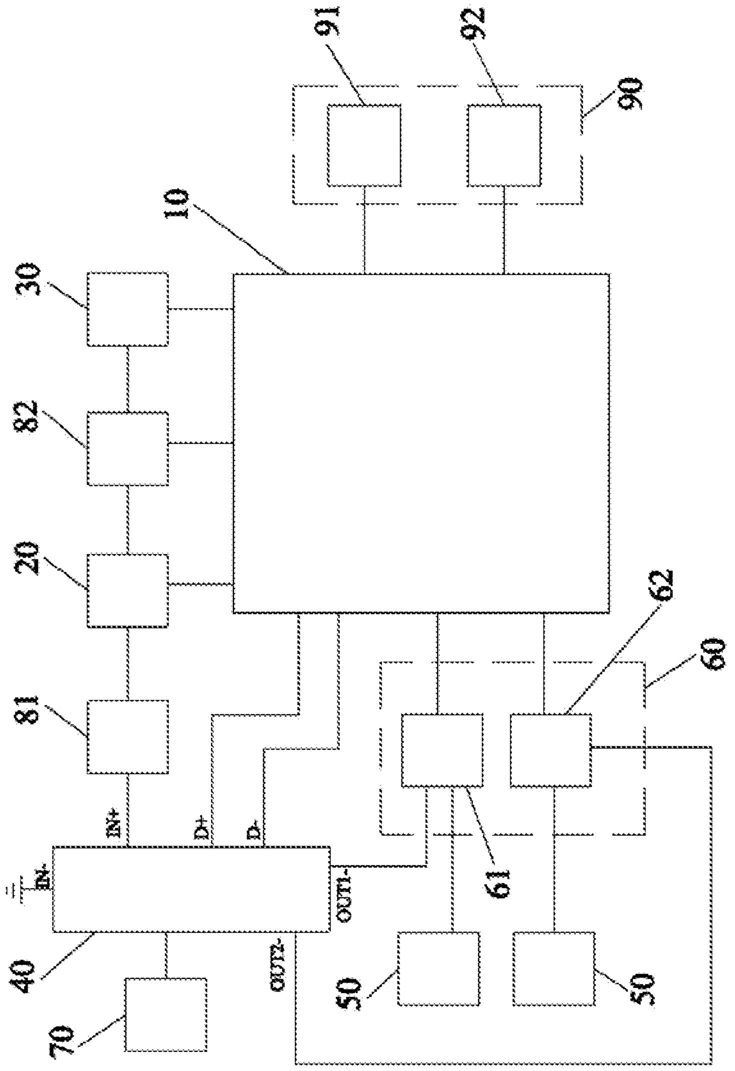
FIG. 1 is a schematic block diagram showing the control principle of a preferred embodiment of the present invention.
Figure 2:
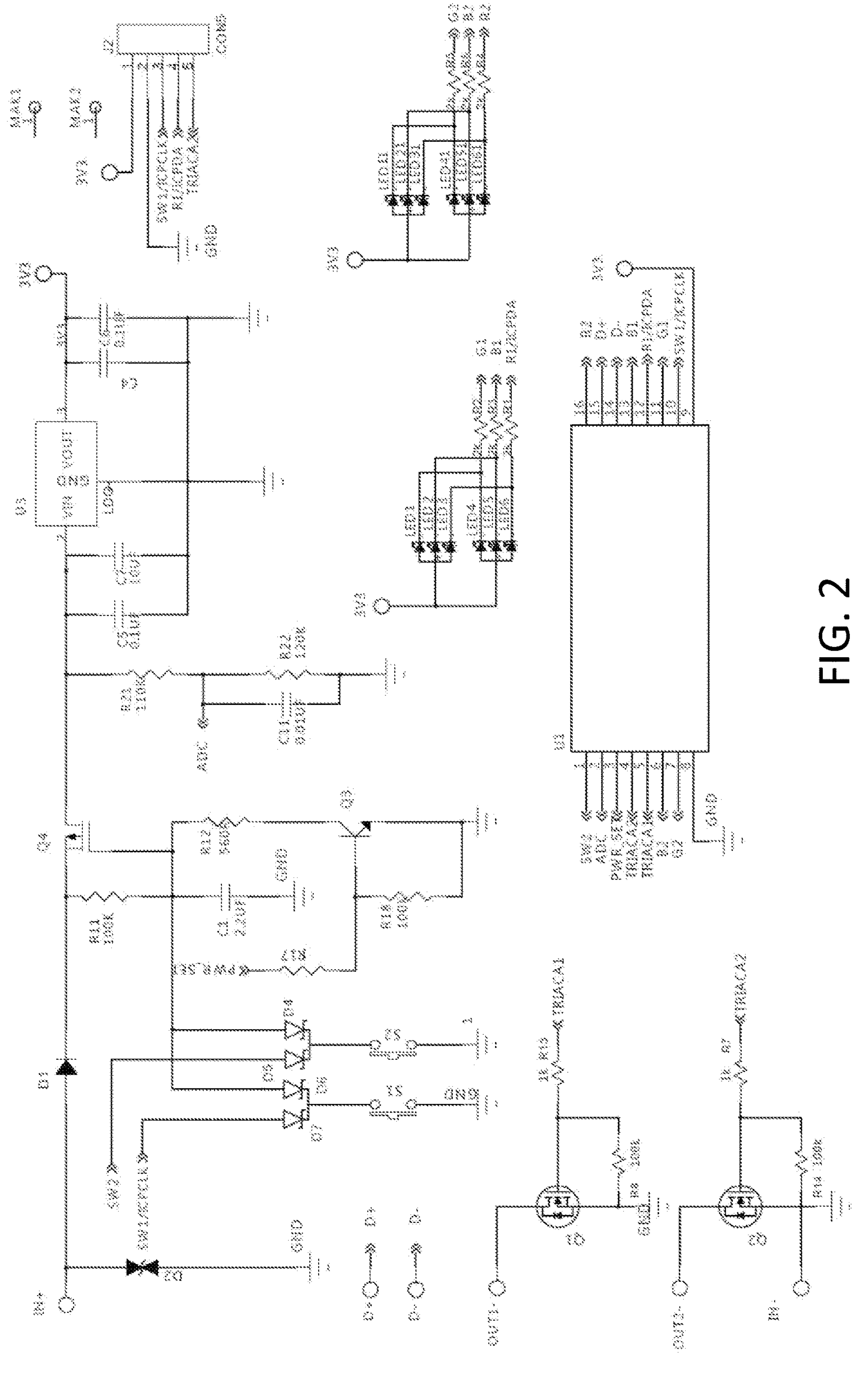
FIG. 2 is a schematic circuit diagram showing a circuit in accordance with a preferred embodiment of the present invention (without showing a quick charge source and a heating load).

With reference to FIGS. 1 and 2 for an intelligent-identification quick-charge heating control device for electric heating products, the device comprises a button wake-up circuit 20 for waking up a quick charge source 70, a main control circuit 10 that supports a quick charge (QC) protocol, a power supply circuit 30 for supplying power to the main control circuit 10, a Type-C interface 40 provided for pairing and coupling the quick charge source 70, and an output control circuit 60 coupled to a heating load 50, and the main control circuit 10 is coupled to the output control circuit 60 and the button wake-up circuit 20.

In this embodiment, the quick charge source 70 is a power bank or a charger that supports the quick charge (QC) protocol. Of course, the quick charge source 70 can also be other Type-C quick charge source 70 and is not limited by this embodiment. The heating load 50 can be a heating wire. Of course, the heating load 50 can be other heating loads 50 and is not limited by this embodiment.

The Type-C interface 40 comprises a pin IN+, a pin IN−, a pin D+, a pin D− and a pin OUT1−, and a pin OUT2−. The pin IN+ is coupled to the power supply circuit 30 through the button wake-up circuit 20, the pin IN− is grounded, the pin D+ and pin D− are coupled to the main control circuit and completes a handshake communication of a quick charge (QC) protocol with the quick charge source 70. In this embodiment, there are two heating loads 50, and the pin OUT1− and the pin OUT2− are coupled to the output control circuit 60 for outputting a 20 VDC voltage to the corresponding heating load 50 to complete a quick charge of the corresponding heating load 50 under the handshake communication condition.

In this embodiment, the main control circuit 10 comprises a main control chip U1 that supports a QC quick charge protocol (such as QC2.0 protocol, QC3.0 protocol and QC4.0 protocol), and the main control chip U1 has a plurality of main control pins 1 to 16.

The main control pin 4 and the main control pin 5 are coupled to the output control circuit separately, the main control pin 9 is coupled to the power supply circuit 30, the main control pin 14 is coupled to the pin D− of the Type-C interface 40, and the main control pin 15 is coupled to the pin D+ of the Type-C interface.

In this embodiment, the output control circuit 60 comprises a first output control circuit 61 and a second output control circuit 62.

The first output control circuit 61 comprises a resistor R13, a resistor R8 and a MOS tube Q1, and the main control pin 4 of the main control circuit 10 is coupled to a gate of the MOS tube Q1 through the resistor R13, the gate of the MOS tube Q1 is coupled to a source of the MOS tube Q1 through the resistor R8, the source of the MOS tube Q1 is grounded, and a drain of the MOS tube Q1 is coupled to the pin OUT1−.

The second output control circuit 62 comprises a resistor R7, a resistor R14 and a MOS tube Q2, the main control pin 5 of the main control circuit 10 is coupled to a gate of the MOS tube Q2 through the resistor R7, the gate of the MOS tube Q2 is coupled to a source of the MOS tube Q2 through the resistor R14, and the source of the MOS tube Q2 is grounded, and a drain of the MOS tube Q2 is coupled to the pin OUT2−.

In this embodiment, the button wake-up circuit 20 comprises a button S1, a diode D6, a diode D7, a resistor R11, a resistor R12, a resistor R17, a resistor R18, a capacitor C1, a MOS tube Q4 and a triode Q3, a cathode of the diode D7 and a cathode of the diode D6 are jointly grounded by the button S1, the main control pin 10 of the main control circuit 10 is coupled to an anode of the diode D7, an anode of the diode D6 is coupled to a collector of the triode Q3 through the resistor R12, and the anode of the diode D6 is coupled to a gate of the MOS tube Q4.

The gate of the MOS tube Q4 is grounded by the capacitor C1, the pin IN+ is coupled to a source of the MOS tube Q4, the source of the MOS tube Q4 and the gate of the MOS tube Q4 are coupled to each other through the resistor R11, and a drain of the MOS tube Q4 is coupled to a voltage regulation pin 2 of the power supply circuit 30; the main control pin 3 of the main control circuit 10 is coupled to a base of triode Q3 through the resistor R17, an emitter of the triode Q3 is grounded, and the base and emitter of the triode Q3 are coupled to each other through the resistor R18.

In this embodiment, in order to wake up the button conveniently, the button wake-up circuit 20 further comprise a button S2, a diode D4 and a diode D5; a cathode of the diode D4 and a cathode of the diode D5 are jointly grounded by the button S2, the main control pin 1 of the main control circuit 10 is coupled to an anode of the diode D5, and an anode of the diode D4 is coupled to the anode of the diode D6.

Since the Type-C interface 40 is plugged in the power bank and situated at a standby mode for a long time, the power bank will be in a sleep mode without outputting power. In this embodiment, regardless of pressing the button S1 or button S2, we can plug in the Type-C interface 40 to wake up the power bank by analogy. For example, pressing the button S1 is used here to illustrate the working principle in this embodiment.

After the button S1 is pressed, the button S1 is grounded instantly, and the MOS tube Q4 is conducted instantly, and the main control chip U1 is started immediately to continue sending a signal to trigger the MOS tube Q4 and maintain the conduction of the MOS tube Q4, so that the main control chip U1 has the power continuously and keeps on conducting the MOS tube Q1 and the MOS tube Q2 to charge the heating load 50 quickly.

The power supply circuit 30 comprises a three-terminal voltage regulator U3, a capacitor C4, a capacitor C5, a capacitor C6, a capacitor C7 and a diode D1.

The three-terminal voltage regulator U3 comprises a plurality of voltage regulation pins 1 to 3, the voltage regulation pin 1 is grounded, the pin IN+ is coupled to a positive electrode of the diode D1, a negative electrode of the diode D1 is coupled to the voltage regulation pin 2, the voltage regulation pin 2 is coupled to the voltage regulation pin 1 through the capacitor C5, the capacitor C7 is coupled in parallel with both terminals of the capacitor C5; the voltage regulation pin 3 outputs a 3.3 VDC voltage to the main control pin 9 of the main control circuit 10, the voltage regulation pin 3 is coupled to the voltage regulation pin 1 through the capacitor C6, and the capacitor C4 is coupled in parallel with both terminals of the capacitor C6.

The present invention further comprises an anti-surge circuit 81, a status indicating light circuit 90, and an over-voltage detection circuit 82 for detecting a voltage between the pin IN+ and the pin IN−.

The pin IN+ is coupled to the voltage regulation pin 2 of the power supply circuit 30 through the anti-surge circuit 81. Preferably, the anti-surge circuit 81 comprises a diode D2 having a terminal coupled to the pin IN+ and the other terminal grounded.

Wherein, a transient voltage suppressor (TVS) diode is a general high-efficiency circuit protection device with an extreme quick response time (sub-nanoscale) and a very high surge absorption capacity. When both terminals of the TVS diode undergo an instant impact of high energy, the TVS diode can change the impedance between the two terminals from high impedance to low impedance and absorb a large instantaneous current and clamp the voltage at both terminals to a predetermined value to protect the subsequent circuits and components from being impacted by the transient high-voltage peak pulse power.

The power supply circuit 30 is electrically coupled to the status indicating light circuit 90, and the status indicating light circuit 90 is coupled to the main control circuit 10.

The status indicating light circuit 90 comprises a first status indicating light circuit 91, and the status indicating light circuit 90 comprises a first status indicating light LED1, a status indicating light LED2, a status indicating light LED3, a status indicating light LED4, a status indicating light LED5, a status indicating light LED6, a resistor R4, a resistor R5 and a resistor R6.

Both negative electrodes of the status indicating light LED1 and the status indicating light LED4 are coupled to the main control pin 7 of the main control circuit 10 through the resistor R5; both negative electrodes of the status indicating light LED2 and the status indicating light LED5 are coupled to the main control pin 6 of the main control circuit 10 of the through the resistor R6; both negative electrodes of the status indicating light LED3 and the status indicating light LED6 are coupled to the main control pin 16 of the main control circuit 10 through the resistor R4; six positive electrodes of the status indicating lights LED1 to LED6 are coupled to the power supply circuit 30. It is noteworthy that there are two heating loads 50 in this embodiment, and thus the status indicating light circuit 90 further comprises a second status indicating light circuit 92, the first status indicating light circuit 91 and the second status indicating light circuit 92 are provided for showing the working status of the corresponding heating loads 50, and the second status indicating light circuit 92 and the first status indicating light circuit 91 have the same circuit structure. The circuit structure of the second status indicating light circuit 92 is illustrated in FIG. 2.

The overvoltage detection circuit 82 comprises a resistor R21, a resistor R22 and a capacitor C11, and the pin IN+ is coupled to the main control pin 2 of the main control circuit 10 through the resistor R21, and the main control pin 2 of the main control circuit 10 is grounded by the resistor R22, and both terminals of the resistor R22 are coupled in parallel with the capacitor C11. In this embodiment, the overvoltage detection circuit 82 is disposed between the button wake-up circuit 20 and the power supply circuit 30.

Next, the principle of identifying the quick charge source 70 and charging the electric heating products quickly will be elaborated below:

After the Type-C interface 40 is plugged and connected to the quick charge source 70, the quick charge source 70 outputs a standard 5 VDC voltage, and the power supply circuit 30 converts the standard 5 VDC voltage into a 3.3V working voltage which is supplied to the main control chip U1 and the status indicating light circuit 90.

After the main control chip U1 is electrically conducted, the main control pin 14 and the main control pin 15 send a handshake signal to the corresponding pin D− and pin D+ of the Type-C interface 40. Once the handshake communication succeeds, the pin OUT1− of the Type-C interface 40 outputs a 20V voltage to the drain of the MOS tube Q1. In the meantime, the pin OUT2− also outputs a 20V voltage to the drain of the MOS tube Q2, so that both MOS tube Q1 and MOS tube Q2 are electrically conducted, and the Type-C interface 40 outputs a 20V voltage to the corresponding heating load 50 for a quick charge and the heating load 50 can be heated quickly.

What is claimed is:

1. An intelligent-identification quick-charge heating control device for electric heating products, comprising: a button wake-up circuit for waking up a quick charge source a main control circuit that supports a quick charge (QC) protocol, a power supply circuit for supplying power to the main control circuit, a Type-C interface for pairing and coupling the quick charge source, and an output control circuit coupled to a heating load, and the main control circuit being coupled to the output control circuit and the button wake-up circuit; wherein, the Type-C interface includes a pin IN+, a pin IN−, a pin D+, a pin D− and a pin OUT1−, the pin IN+ is coupled to the power supply circuit through the button wake-up circuit, the pin IN− is grounded, the pin D+ and pin D− are coupled to the main control circuit and completes a handshake communication of a quick charge (QC) protocol with the quick charge source, the pin OUT1− is coupled to the output control circuit to quickly charge the heating load under the condition of the handshake communication.

2. The intelligent-identification quick-charge heating control device for electric heating products as claimed in claim 1, wherein the main control circuit comprises a main control chip U1 having a plurality of main control pins 1 to 16, the main control pin 4 and the main control pin 5 are coupled to the output control circuit separately, the main control pin 9 is coupled to the power supply circuit, the main control pin 14 is coupled to the pin D− of the Type-C interface, and the main control pin 15 is coupled to the pin D+ of the Type-C interface.

3. The intelligent-identification quick-charge heating control device for electric heating products as claimed in claim 1, wherein the output control circuit comprises a resistor R13, a resistor R8 and a MOS tube Q1, and the main control circuit is coupled to a gate of the MOS tube Q1 through the resistor R13, the gate of the MOS tube Q1 is coupled to a source of the MOS tube Q1 through the resistor R8, the source of the MOS tube Q1 is grounded, and a drain of the MOS tube Q1 is coupled to the pin OUT1−.

4. The intelligent-identification quick-charge heating control device for electric heating products as claimed in claim 1, wherein the Type-C interface further comprises a pin OUT2−; the output control circuit further comprises a resistor R7, a resistor R14 and a MOS tube Q2; the main control circuit is coupled to a gate of the MOS tube Q2 through the resistor R7, the gate of the MOS tube Q2 is coupled to a source of the MOS tube Q2 through the resistor R14, the source of the MOS tube Q2 is grounded, and a drain of the MOS tube Q2 is coupled to the pin OUT2−.

5. The intelligent-identification quick-charge heating control device for electric heating products as claimed in claim 1, wherein the button wake-up circuit comprises a button S1, a diode D6, a diode D7, a resistor R11, a resistor R12, a resistor R17, a resistor R18, a capacitor C1, a MOS tube Q4 and a triode Q3, a cathode of the diode D7 and a cathode of the diode D6 are jointly grounded by the button S1, the main control circuit is coupled to an anode of the diode D7, an anode of the diode D6 is coupled to a collector of the triode Q3 through the resistor R12, and the anode of the diode D6 is coupled to a gate of the MOS tube Q4; the gate of the MOS tube Q4 is grounded by the capacitor C1, the pin IN+ is coupled to a source of the MOS tube Q4, the source of the MOS tube Q4 and the gate of the MOS tube Q4 are coupled to each other through the resistor R11, and a drain of the MOS tube Q4 is coupled to the power supply circuit; the main control circuit is coupled to a base of triode Q3 through the resistor R17, an emitter of the triode Q3 is grounded, and the base and emitter of the triode Q3 are coupled to each other through the resistor R18.

6. The intelligent-identification quick-charge heating control device for electric heating products as claimed in claim 1, further comprising an overvoltage detection circuit for detecting a voltage between the pin IN+ and the pin IN−, wherein, the overvoltage detection circuit comprises a resistor R21, a resistor R22 and a capacitor C11, the pin IN+ is coupled to the main control circuit through the resistor R21, the main control circuit is grounded by the resistor R22, and both terminals of the resistor R22 are coupled in parallel with the capacitor C11.

7. The intelligent-identification quick-charge heating control device for electric heating products as claimed in claim 1, further comprising an anti-surge circuit, and the pin IN+ being coupled to the power supply circuit through the anti-surge circuit.

8. The intelligent-identification quick-charge heating control device for electric heating products as claimed in claim 1, further comprising a status indicating light circuit, and the power supply circuit being electrically coupled to the status indicating light circuit, and the status indicating light circuit being coupled to the main control circuit.

9. The intelligent-identification quick-charge heating control device for electric heating products as claimed in claim 8, wherein the status indicating light circuit comprises a status indicating light LED1, a status indicating light LED2, a status indicating light LED3, a status indicating light LED4, a status indicating light LED5, a status indicating light LED6, a resistor R4, a resistor R5 and a resistor R6; both negative electrodes of the status indicating light LED1 and the status indicating light LED4 are coupled to the main control circuit through the resistor R5; both negative electrodes of the status indicating light LED2 and the status indicating light LED5 are coupled to the main control circuit through the resistor R6; both negative electrodes of the status indicating light LED3 and the status indicating light LED6 are coupled to the main control circuit through the resistor R4; and six positive electrodes of the status indicating lights LED1 to LED6 are coupled to the power supply circuit.

10. The intelligent-identification quick-charge heating control device for electric heating products as claimed in claim 1, wherein the power supply circuit comprises a three-terminal voltage regulator U3, a capacitor C4, a capacitor C5, a capacitor C6, a capacitor C7 and a diode D1; the three-terminal voltage regulator U3 comprises a plurality of voltage regulation pins 1 to 3, the voltage regulation pin 1 is grounded, the pin IN+ is coupled to a positive electrode of the diode D1, a negative electrode of the diode D1 is coupled to the voltage regulation pin 2, the voltage regulation pin 2 is coupled to the voltage regulation pin 1 through the capacitor C5, the capacitor C7 is coupled in parallel with both terminals of the capacitor C5; the voltage regulation pin 3 outputs a 3.3 VDC voltage to the main control circuit, the voltage regulation pin 3 is coupled to the voltage regulation pin 1 through the capacitor C6, and the capacitor C4 is coupled in parallel with both terminals of the capacitor C6.

* * * * *